(12) United States Patent
DaSilva et al.

(10) Patent No.: US 6,674,557 B1
(45) Date of Patent: Jan. 6, 2004

(54) WAVELENGTH DIVISION MULTIPLEXING SYSTEMS

(75) Inventors: Valeria L. DaSilva, Hillsborough, NJ (US); Yanming Liu, Horseheads, NY (US); Alan J. Lucero, E. Brunswick, NJ (US); Sergio Tsuda, N. Brunswick, NY (US); Karin M. Ennser, Somerset, NJ (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/400,401

(22) Filed: Sep. 21, 1999

Related U.S. Application Data
(60) Provisional application No. 60/101,241, filed on Sep. 21, 1998.

(51) Int. Cl.[7] .................................................. H04J 14/02
(52) U.S. Cl. ...................... 359/124; 359/122; 359/133; 359/161
(58) Field of Search ................................ 359/124, 122, 359/133, 161, 173

(56) References Cited

U.S. PATENT DOCUMENTS

| | | | |
|---|---|---|---|
| 5,608,562 A | * 3/1997 | Delavaux et al. ............ | 359/161 |
| 5,710,650 A | * 1/1998 | Dugan .......................... | 359/133 |
| 5,815,294 A | 9/1998 | Ishikawa et al. | |
| 5,877,811 A | 3/1999 | Iijima et al. | |
| 5,880,876 A | 3/1999 | Kikuchi et al. | |
| 5,886,804 A | 3/1999 | Onaka et al. | |
| 6,137,604 A | * 10/2000 | Bergano ....................... | 359/124 |
| 6,178,021 B1 | * 1/2001 | Bruyere et al. ............. | 359/122 |
| 6,266,170 B1 | * 7/2001 | Fee ............................... | 359/161 |
| 6,320,687 B1 | * 11/2001 | Ishikawa ..................... | 359/161 |

* cited by examiner

*Primary Examiner*—John Tweel
(74) *Attorney, Agent, or Firm*—Mary Y. Redman

(57) ABSTRACT

A long haul, broadband DWDM system that has been optimized by the proper selection of the distribution of total dispersion compensation. Dispersion compensation is utilized at both the receiver and transmitter ends. System performance is dependent on the ratio of compensation split between the transmitter and the receiver. A system operated in the nonlinear regime can be compensated to operate with low BER and with reduced penalties due to residual dispersion effects, even when the spread of total accumulated dispersion between the extreme channels in a broadband system exceeds 1,100 ps/nm.

24 Claims, 5 Drawing Sheets

● FWM crosstalk
▲ Q ( dB ) full system

WAVELENGTH DIVISION MULTIPLEXING SYSTEMS

This application claims the benefit of U.S. Provisional Application No. 60/101,241 filed on Sep. 21, 1998, which is hereby incorporated by reference in its entirety.

FIELD OF THE INVENTION

This invention relates to wavelength division multiplexers (WDMs) systems and, more particularly, to dense WDMs (DWDMs), in which dispersion compensation is utilized at both the receiver and transmitter ends, and further wherein a WDM is optimized overall.

BACKGROUND OF THE INVENTION

Various effects of linear chromatic dispersion in optical communications systems have been investigated. In particular, the use of dispersion compensation techniques at either the receiver or transmitter ends of a wavelength division multiplexer have been of interest.

This invention pertains to the simultaneous use of dispersion compensation at both the receiver (RX) and transmitter (TX) ends of a dense WDM to obtain better performance. The invention provides techniques for optimizing dual dispersion compensation, given the characteristics of the overall WDM and its associated network.

One factor significantly affecting the optimum ratio for dispersion compensation at the RX and TX ends is the chirp value of the transmitter. Other factors include power level, number of channels, channel plan, fiber dispersion, and system length.

Providing dispersion compensation simultaneously at both the RX and TX ends of the WDM system can produce superior results compared with compensation at a single end. However, the type and distribution of the dispersion (dispersion ratio) between the RX and TX ends must be balanced for the particular system. If not properly balanced, the results can be inferior even to those for single ended compensation.

The dispersion compensation ratio can be adjusted experimentally by trial and error, but this method is burdensome and painstaking. Optimization can initially be more readily analyzed using a simulation, which describes the propagation of the light wave in the fiber. Software that can perform this analysis is available commercially. The analysis can simulate propagation along all channels and account for meaningful nonlinear effects and dispersion effects at the same time.

An article by Hayee, M. I., et al, I.E.E.E. Photonics Technology Letters, 1997, entitled, "Pre- and Post-Compensation of Dispersion and Nonlinearities in 10 Gb/s WDM Systems", which is hereby incorporated by reference in its entirety, teaches that dual compensation gives the minimal penalty for each channel in dispersion-managed WDM systems. Further, the article teaches that the optimal amount of pre- and post-compensation is dependent upon the specific dispersion map used in the WDM system. Hayee describes a sparse system having only eight channels; and with power and distance which are appropriate only for low power (1500 km) submarine systems. Unlike the present invention, the pre- and post-compensation of dispersion set forth by Hayee are determined individually and not in a coordinated way, as befits a system.

SUMMARY OF THE INVENTION

In accordance with the present invention, there is provided a method and system for compensating dispersion in long haul broadband Dense Wavelength Division Multiplexers (DWDM systems). A typical long haul broadband DWDM in accordance with this invention, utilizes a system of DFB (distributed feedback) lasers comprising thirty-two channels on an ITU (International Telecommunications Union) grid. The lasers are multiplexed and modulated at 10 Gbit/s by a nominal zero-chirp modulator. The signals are directed to a system of five 90 km spans of large effective aperture fiber such as that sold under the registered trademark LEAF® by Corning Incorporated. Optical amplifiers provide signal gain at the input to each span. Commercial units of Dispersion Compensating Modules are provided. The dispersion compensating modules are applied at the transmitter and receiver ends. Proper selection of the distribution of total dispersion compensation determined by simulation, and verified by experiment, optimizes the DWDM system.

It is an object of this invention to provide an improved method and system for compensating dispersion and nonlinear penalties in long haul broadband Dense Wavelength Division Multiplexers (DWDMs).

It is another object of the invention to provide an improved method and system for compensating dispersions in long haul broadband DWDMs, in which dispersion compensation is utilized at both the receiver and transmitter ends, and further wherein the DWDM is optimized overall.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a long haul, broadband, DWDM system that has been optimized by the proper selection of the distribution of total dispersion compensation. Dispersion compensation is utilized at both the receiver and transmitter ends. System performance is dependent on the ratio of compensation split between the transmitter and the receiver. A system operated in the nonlinear regime can be compensated to operate at low BER and with tolerable residual dispersion effects, even when the spread of total accumulated dispersion between the extreme channels in a broadband system exceeds 1,100 ps/nm.

Figure 1:
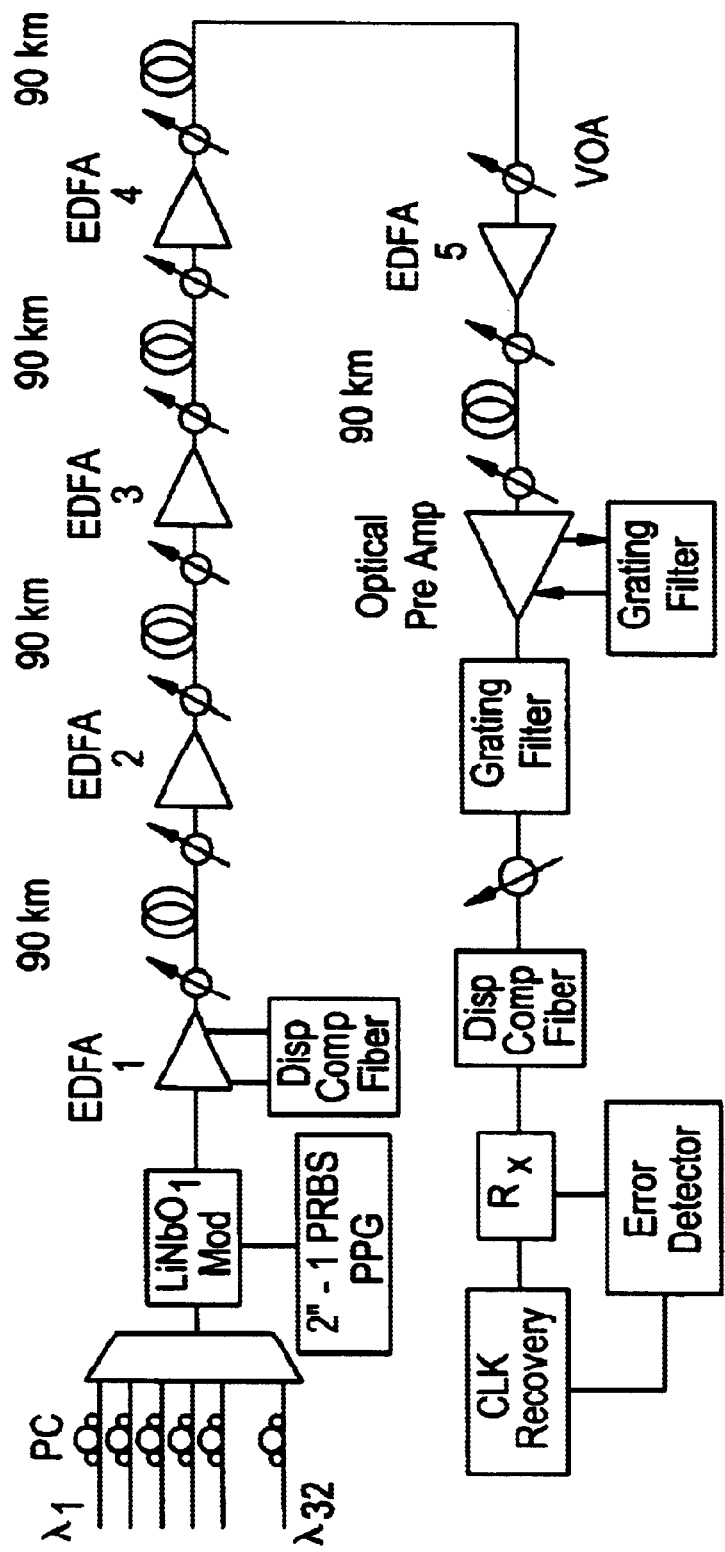
FIG. 1 illustrates a schematic diagram of a typical fiber optic system in accordance with this invention.

Now referring to FIG. 1, a schematic diagram shows a typical DWDM system in accordance with this invention. The system is of the long haul type, and designed to be deployable terrestrially. The system utilizes DFB lasers comprising thirty-two channels on an ITU grid.

In an early simulation, the optical amplifiers disposed at the input to each span were characterized by a 25 dB external gain, total power output of 20 dBm (19 dBm directed into the fiber spans), an average noise figure of 5 dB, and an average gain ripple of 1.2 dB. Commercial units of Dispersion Compensating Modules were provided as DCM-X, where X was the equivalent length in kilometers of standard single mode fiber dispersion, compensated by the dispersion compensating module. The DCM modules were applied at the transmitter and receiver ends. Combinations of ratios of compensating modules at the transmitter and receiver from DCM-20 (−340 ps/nm) to DCM-60 (−986 ps/nm) in steps of DCM-10 (−160 ps/nm) were integrated and their effect recorded. Proper selection of the distribution of total dispersion compensation determined by simulation and verified by experiment optimized the DWDM system.

The TABLE shown below presents a summary of the performance of the worst channel in each configuration for the system:

TABLE

| Pre-Compensation DCM | Post-Compensation DCM | BER for Select Channels | | | | |
|---|---|---|---|---|---|---|
| | | 2 | 4 | 16 | 31 | 33 |
| 20 | 30 | <1E-13 | <1E-13 | 3.E-11 | 5.E-10 | 4.E-10 |
| 20 | 40 | 9.E-13 | 9.E-12 | <1E-13 | 2.E-12 | 1.E-12 |
| 30 | 20 | <1E-13 | <1E-13 | <1E-13 | <1E-13 | <1E-13 |
| 30 | 30 | <1E-13 | <1E-13 | <1E-13 | <1E-13 | <1E-13 |

Note that rows one and three have the same total compensations and the same is true for rows two and four, yet the system performances are markedly different depending on the ratios of the pre- and post-compensation values.

In a later experiment, the lasers were multiplexed with fiber couplers, and modulated with a $2^{31}-1$, 10 GBit/s pseudorandom bit stream (PRBS) by a $Li:NbO_3$, zero-chirp, Mach-Zehnder modulator. The lasers match the ITU-T nominal central frequency grid and minimal channel spacing of 100 GHz. The first channel wavelength is $\lambda_1=1532.68$ nm (195.6 THz) and the last channel wavelength is $\lambda_{32}=1557.36$ nm (192.5 THz). After amplification, the signals were transmitted over a 450 km transmission line consisting of 5×90 km spans of LEAF® large effective aperture fiber and four in-line optical amplifiers. LEAF® fiber has an effective area of 72–78 $\mu m^2$, which is about 50% larger than typical NZ-DSF. The fibers $\lambda_O$ varied between 1506 nm and 1514 nm, and dispersion slope was ≈0.1 $ps/nm^2/km$. With a Variable Optical Attenuator (VOA), the total launch power was adjusted in each span to +19 dBm, which corresponds to an average power of approximately +4 dBm/channel.

The span loss was increased to 24 dB by adding optical attenuators before each amplifier in order to simulate real system loss margin needed for real systems. A tunable narrow band fiber grating filter, with an FWHW of 0.3 nm at the optical pre-amplifier, selected the channel to be measured. A variable optical attenuator was used to keep the power substantially constant into the O-E converter.

Figure 2B:
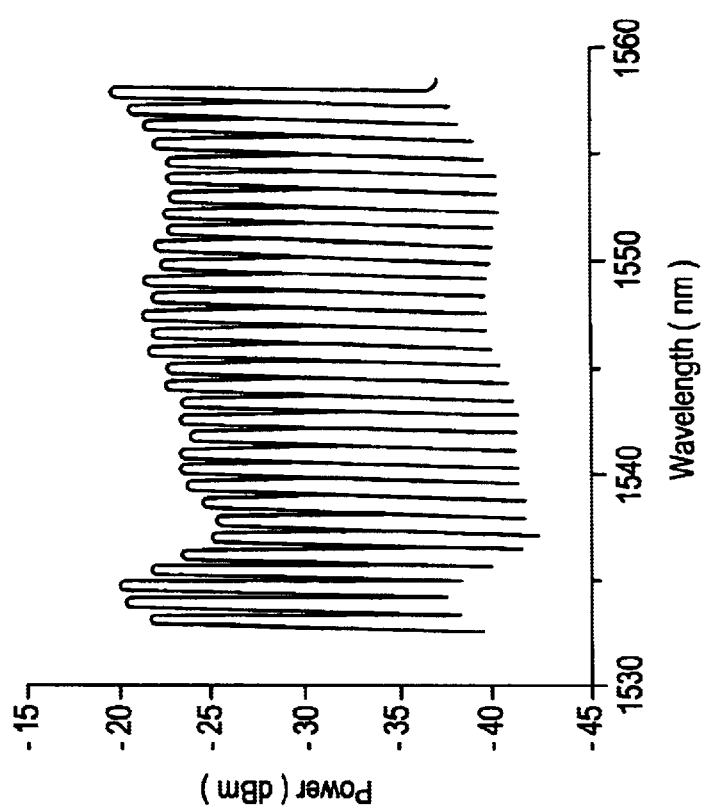
FIG. 2 depicts a diagrammatic view of the spectra obtained for the fiber optic system shown in FIG. 1.
Figure 2A:
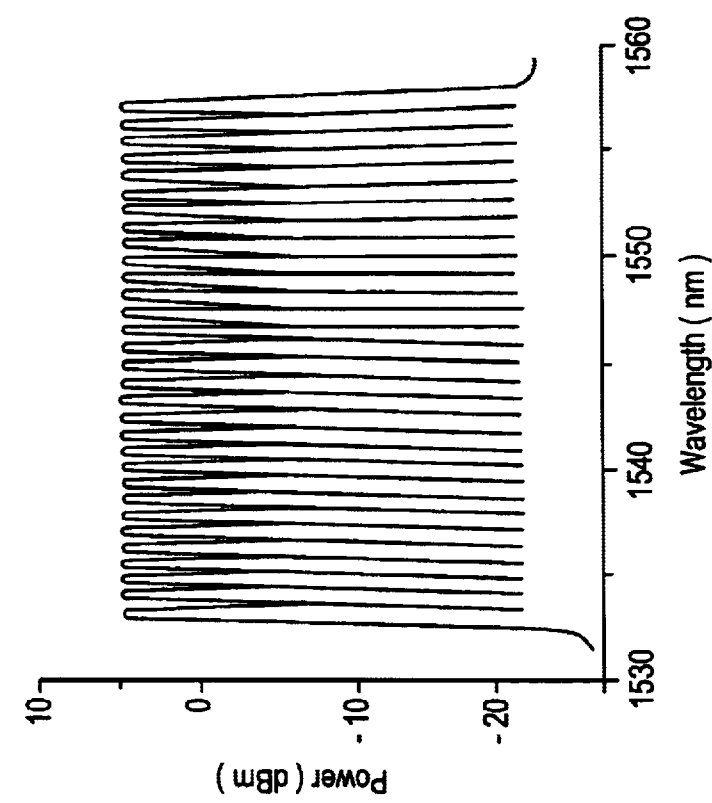

The input spectrum before the first VOA and output spectrum before the optical preamplifier are shown in FIG. 2. The same amount of pre- and post-compensation was used for all channels. At the system output, the total accumulated dispersion for the first channel was −454.78 ps/nm and +893.81 ps/nm for the last channel.

Figure 3:
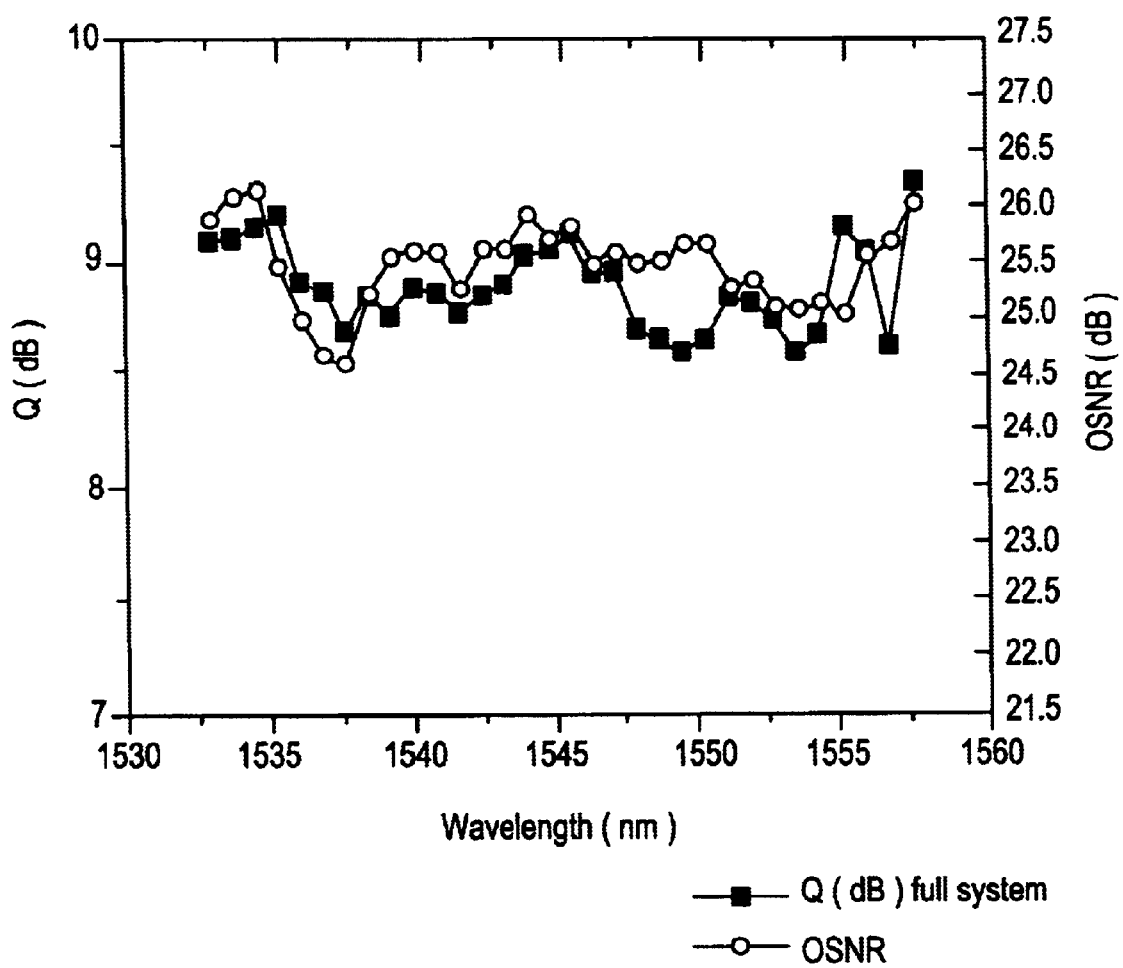
FIG. 3 shows a graph of Q versus wavelength for the fiber optic system depicted in FIG. 1.
Figure 5A:
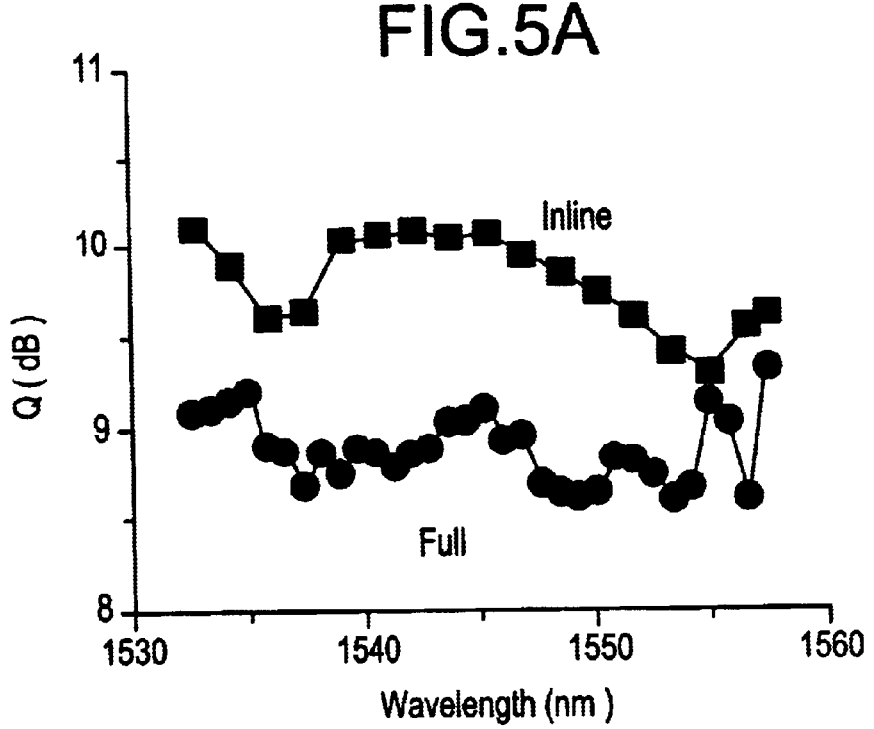
FIG. 5a shows a graphical view of Q, as a function of wavelength, for the fully assembled system (squares), together with the Q measured with transmission fiber having been replaced by attenuators (circles)
Figure 5B:
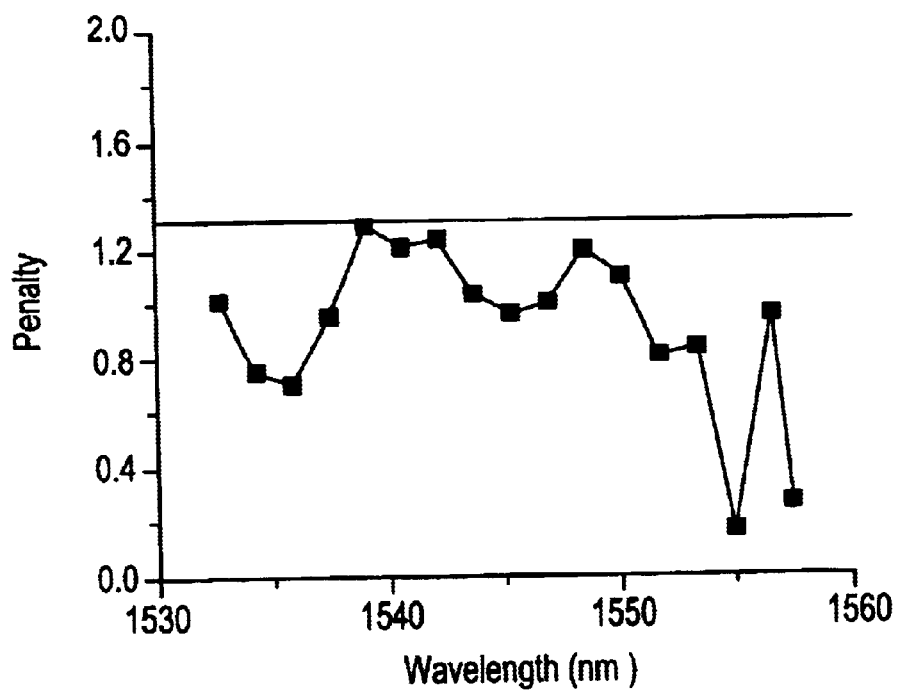
FIG. 5b depicts a graphical view of the penalty of the fiber (dB) vs. the wavelength (nm).

The transmission performance was characterized by measuring the bit error rate as a function of the decision threshold for each channel. The system Q was estimated using the full system (fiber+amplifiers) and with fiber spans replaced by attenuators with equivalent loss. The results of the measurements for the full system are illustrated in FIG. 3. The average Q for the full system was approximately 8.9 dB optical (BER=$4.5 \times 10^{-15}$) with a small variation across the whole band. The lowest Q, as seen in FIG. 5a, corresponded to channel 27 (Q=8.6 dB, BER=$2.2 \times 10^{-13}$). These results, compared to those without the fiber (amplifiers+attenuators), showed an average fiber-induced penalty of 0.9 dB with a maximum of 1.3 dB penalty for channel 12 as in FIG. 5b.

The channels around 1550 nm, however, did not show this correlation, and may have been affected by nonlinear contributions. An improvement of 0.1 to 0.5 dB in the optical Q was observed by reducing the total launched power into all fiber spans to +17.5 dBm, while keeping the OSNR constant. This improvement demonstrates that the fiber effectively limits the nonlinear impairments to small values.

Figure 4:
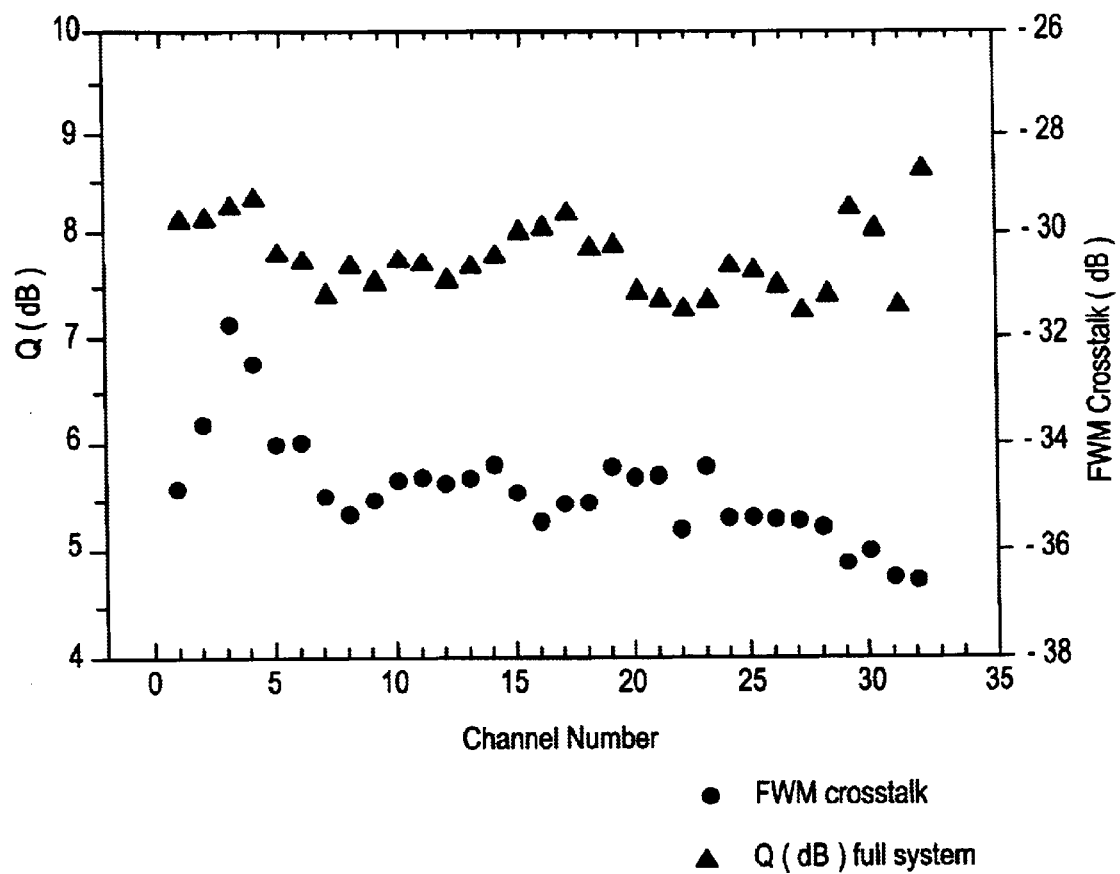
FIG. 4 illustrates a graphical view of Q versus channel number compared with the FWM spectrum for the same channels for the fiber optic system depicted in FIG. 1.

Four Wave Mixing (FWM), Cross-Phase Modulation (XPM), and Self-Phase Modulation (SPM) are usually the major nonlinear penalties in dense WDM systems. In order to quantify the effect of FWM penalties, each channel was turned off individually across the band and measured for FWM products generated by neighboring channels, as illustrated in FIG. 4. The strongest FWM products were measured at more than 30 dB below the signal power level, which is too low to have any significant effect upon the system. Owing to the fact that there is no correlation between the FWM crosstalk and the measured Q values, it can be concluded that the penalties introduced come from a combination of linear dispersion and the nonlinear contributions of XPM and SPM.

Measured Q factors greater than 8.6 dB (BER≈$2.2 \times 10^{-13}$) for all channels, and a maximum fiber-induced penalty of 1.3 dB can be achieved with this system. The 32 channel system can be optimized with a single, dispersion compensating module design, with no splitting of the signal band, and with negligible variation in dispersion-related system penalty across the channel plan.

Dense WDM can greatly increase the capacity of transmission at the cost of managing the penalty induced by optical nonlinearities. Systems that use non-dispersion shifted fibers must use dispersion compensation on a span by span basis when bit rates greater than, or equal to, 10 Gbit/s/channel are used.

The use of non-zero dispersion-shifted fibers (NZ-DSF) reduces the need for dispersion compensation. Uncompensated WDM transmission can be achieved at 10 Gb/s over 360 km by optimizing the fiber dispersion. Dispersion management is usually used for longer distances.

In a study establishing the split dispersion compensating module ratio technique, an experiment was performed using blue (1530 nm to 1540 mn) and red (1548 nm to 1562 nm) band transmissions. Error-free transmissions were observed at 10 Gbit/s for both blue (1530–1540 nm) and red (1550–1560 nm) wavelength regions within the erbium-doped fiber amplifier (EDFA) gain band; only pre- and post-dispersion compensation were required. The red band experiment utilized eight uniformly spaced (200 GHz) channels ranging from 1549.3 nm to 1560.6 nm, while the blue band experiment used four channels ranging from 1531.9 nm to 1536.6 nm, with 200 Ghz channel spacing. The lasers were combined in a fiber coupler and modulated with a $2^{31}-1$, 10 Gbit/s pseudorandom bit stream by a Mach-Zehnder $LiNbO_3$ modulator.

After amplification, the signals were transmitted over a 450 km transmission line consisting of five spans of ninety km LEAF® fiber, and four in-line optical amplifiers. The total output power of each amplifier was adjusted to be 16 dBm, for the red band experiment, and 13 dBm for the blue band experiment, which corresponded to an average power of 7 dBm/channel.

In order to simulate one aspect of the aging of field-deployed systems, the span loss was increased to 24 dB by adding optical attenuators before each amplifier. An etalon filter with an FWHM of 0.3 nm at the optical pre-amplifier selected the channel to be measured.

A small amount of dispersion compensation was used for both experiments. For the red band, a first dispersion unit with a total dispersion of 688 ps/nm at 1550 nm was placed after the modulator, and a second dispersion unit was placed after the optical pre-amplifier. Less dispersion compensation was required for the blue band experiment. A unit with 344 ps/nm was placed after the pre-amplifier. In both experiments, the power per channel coupled into the dispersion compensators was kept below 0 dBm in order to avoid nonlinear effects.

Optical pre-emphasis was required to equalize the received optical signal-to-noise ratio at the end of the transmission line for the red band experiment. Four Wave Mixing (FWM) was not observed in either the red or the blue experiment.

A negative penalty found for channel 1 indicated an optimum balance between self/cross-phase modulation and dispersion. The penalty for the other channels was due to undercompensation of the dispersion.

Error-free transmission was obtained for all channels in both red and blue experiments, when the span loss was adjusted to 24 dB. This corresponds to a received power of −21.9 dBm for channel 1, to −15.1 dBm for channel 8 for red. In other words, more power (14 to 19 dBm) was necessary to obtain a bit-error rate of $10^{-9}$. For blue, sensitivity varied between −34.5 dBm and −34.0 dBm. This equates to a power penalty of 0.5 to 1.0 dB.

From the negligibly small observable FWM spectral product, it is obvious that the large effective aperture fiber effectively suppresses FWM in dense WDM systems. Furthermore, due to its large effective area and small dispersion, this fiber allows for the minimization of self- and cross-phase modulation penalties at 10 Gbit/s, using dispersion compensation at the terminal. This eliminates the need for dispersion management in the cable or at every amplifier.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. In particular, the invention is pertinent and applicable to WDM systems operating in the L-Band (~1568–1615 nm) and the S-Band (~1475–1505 nm).

Having thus described the invention, what is desired to be protected by Letters Patent is presented in the subsequently appended claims.

What is claimed is:

1. A dispersion compensated optical communication system, comprising:

a multi-channel system of lasers;

a plurality of spans of fiber operatively connected at an input end to said laser system for receiving signals therefrom and having an output end, each of said plurality of spans of fiber having a transmitter end and a receiver end in series;

a plurality of optical amplifiers, each disposed at an input to one of said spans of fiber;

a pre-transmission dispersion compensator applied to said input end of said plurality of spans of fiber;

a post-transmission dispersion compensator applied to said output end of said plurality of spans of fiber;

the ratio of dispersion compensation provided by said pre-transmission dispersion compensator and said post-transmission dispersion compensator being pre-selected so as to provide a predetermined distribution of dispersion compensation in the system.

2. The system in accordance with claim 1, wherein said system comprises a Dense Wavelength Division Multiplexing (DWDM) system having long haul, broadband DWDMs.

3. The system in accordance with claim 1, wherein said lasers are modulated.

4. The system in accordance with claim 3, wherein said system operates at a modulation rate from approximately 2.5 to approximately 40 GBit/s.

5. The system in accordance with claim 1, wherein said laser system comprises at least 16 channels.

6. The system in accordance with claim 1, wherein the ratio between pre-transmission and post-transmission dispersion compensation is 60/40%±10% of a total value of dispersion compensation.

7. An optimized, dispersion compensated, Dense Wavelength Division Multiplexing (DWDM) system, comprising:

a multi-channel system of lasers;

means operatively connected to said lasers for multiplexing and modulating said lasers;

multiple spans of fiber operatively connected to said lasers for receiving signals therefrom, said multiple spans of fiber each having transmitter and receiver ends;

optical amplifiers disposed at an input to each span of said fibers;

dispersion compensating modules applied to said transmitter and receiver ends of each of said fiber spans; and selection means associated with said dispersion compensating modules for distributing dispersion compensation, whereby said DWDM system is optimized.

8. The optimized, dispersion compensated, Dense Wavelength Division Multiplexing (DWDM) system in accordance with claim 7, wherein said system comprises long haul, broadband DWDMs.

9. The optimized, dispersion compensated, Dense Wavelength Division Multiplexing (DWDM) system in accordance with claim 7, wherein said lasers are modulated.

10. The optimized, dispersion compensated, Dense Wavelength Division Multiplexing (DWDM) system in accordance with claim 7, wherein said system operates at a modulation rate from approximately 2.5 to approximately 40 GBit/s.

11. The optimized, dispersion compensated, Dense Wavelength Division Multiplexing (DWDM) system in accordance with claim 7, wherein said system comprises at least 16 channels.

12. The optimized, dispersion compensated, Dense Wavelength Division Multiplexing (DWDM) system in accordance with claim 7, wherein said selection means comprises simulation software.

13. The optimized, dispersion compensated, Dense Wavelength Division Multiplexing (DWDM) system in accordance with claim 7, wherein an optimum dispersion compensation split ratio, comprising pre- and post-dispersion, is 60/40%±10% of a total value of dispersion compensation.

14. An optimized, dispersion compensated, Dense Wavelength Division Multiplexing (DWDM) system, comprising:
- a laser system having at least one channel;
- means operatively connected to each laser for multiplexing and modulating each laser;
- multiple spans of fiber operatively connected to each laser for receiving signals therefrom, said multiple spans of fiber each having transmitter and receiver ends;
- optical amplifiers disposed at an input to each span of said fibers;
- a dispersion compensating module applied to each of said transmitter and receiver ends of each of said fiber systems; and
- selection means associated with said dispersion compensating modules for distributing dispersion compensation, whereby said DWDM system is optimized.

15. The optimized, dispersion compensated, Dense Wavelength Division Multiplexing (DWDM) system in accordance with claim 14, wherein said system comprises long haul, broadband DWDMs.

16. The optimized, dispersion compensated, Dense Wavelength Division Multiplexing (DWDM) system in accordance with claim 14, wherein said lasers are modulated.

17. The optimized, dispersion compensated, Dense Wavelength Division Multiplexing (DWDM) system in accordance with claim 14, wherein said system operates at a modulation rate selected from approximately 2.5 to approximately 40 GBit/s.

18. The optimized, dispersion compensated, Dense Wavelength Division Multiplexing (DWDM) system in accordance with claim 14, wherein said system comprises at least 16 channels.

19. The optimized, dispersion compensated, Dense Wavelength Division Multiplexing (DWDM) system in accordance with claim 8, wherein said selection means comprises simulation software.

20. The optimized, dispersion compensated, Dense Wavelength Division Multiplexing (DWDM) system in accordance with claim 14, wherein an optimum dispersion compensation split ratio, comprising pre- and post-dispersion, is 60/40%±10% of a total value of dispersion compensation.

21. An optimized, dispersion compensated, Dense Wavelength Division Multiplexing (DWDM) system, comprising:
- a multi-channel system of lasers disposed upon a grid;
- means operatively connected to said lasers for facilitating multiplexing and modulation thereof;
- multiple spans of fiber operatively connected to said lasers for receiving signals therefrom, said multiple spans of fiber each having transmitter and receiver ends;
- optical amplifiers disposed at an input to each of said multiple spans of fiber; and
- dispersion compensating modules applied to said transmitter and receiver ends of each of said fibers.

22. The optimized, dispersion compensated, Dense Wavelength Division Multiplexing (DWDM) system in accordance with claim 21, wherein said system comprises long haul, broadband DWDMs.

23. The optimized, dispersion compensated, Dense Wavelength Division Multiplexing (DWDM) system in accordance with claim 21, wherein said system operates at a modulation rate selected from modulation rates from approximately 2.5 to approximately 40 GBit/s.

24. An optimized, dispersion compensated, Dense Wavelength Division Multiplexing (DWDM) system, comprising:
- a grid system including multiple channels of lasers;
- means operatively connected to said lasers for facilitating modulation and multiplexing thereof;
- multiple spans of fiber operatively connected to said lasers for receiving signals therefrom, said multiple spans of fiber each having transmitter and receiver ends;
- optical amplifiers disposed at an input to each of said spans of fiber;
- and dispersion compensating modules applied to said transmitter and receiver ends of each fiber span.

* * * * *